UNITED STATES PATENT OFFICE.

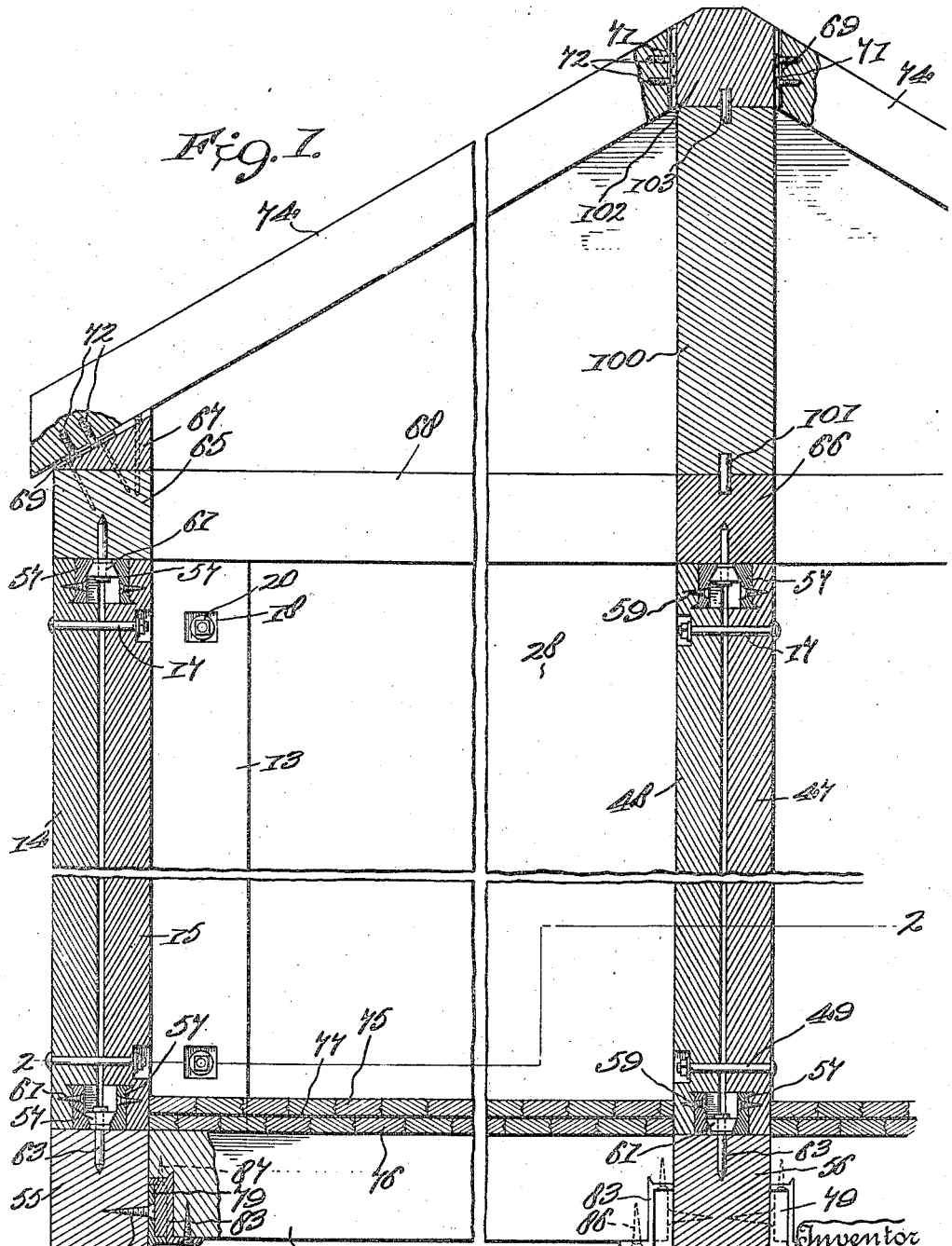

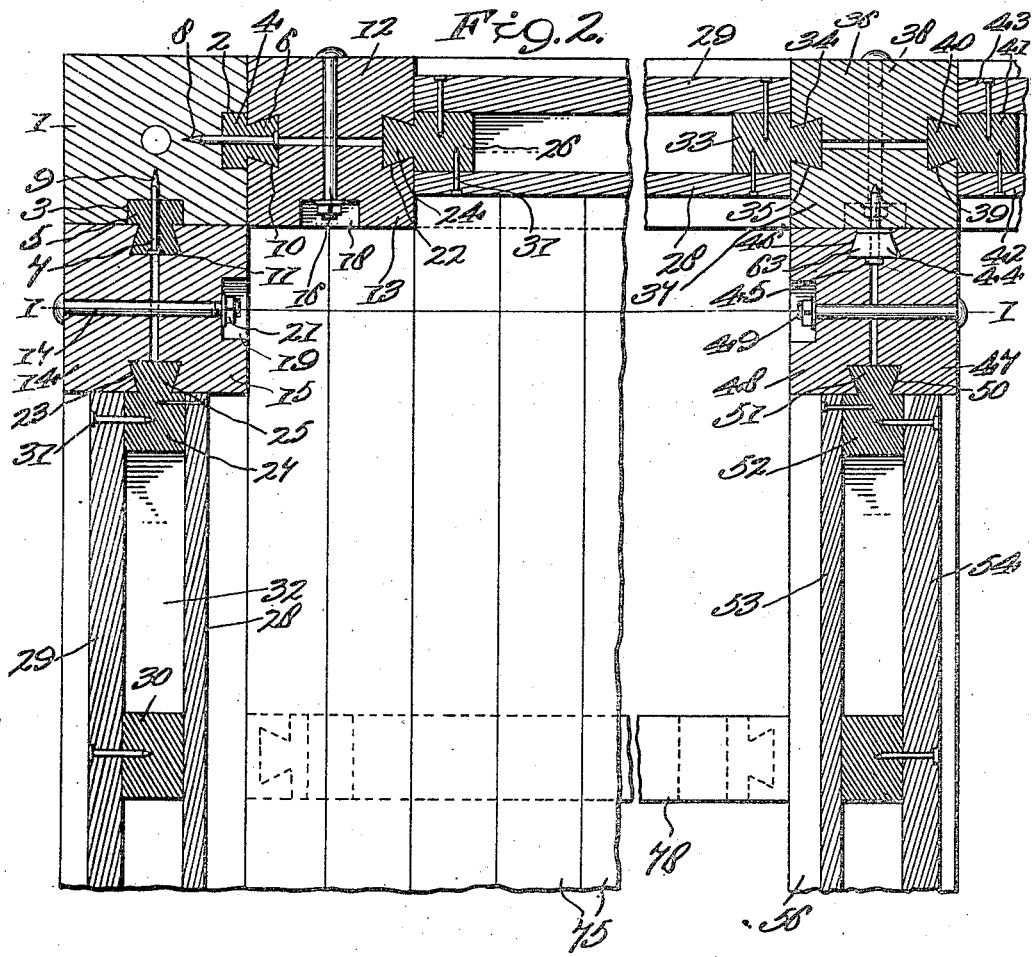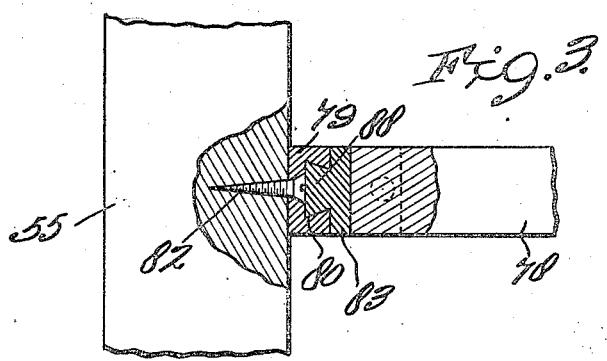

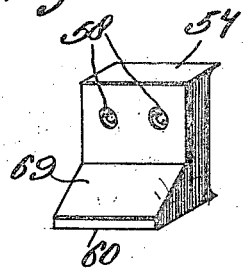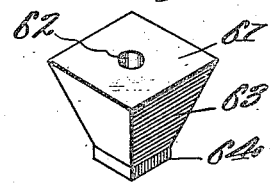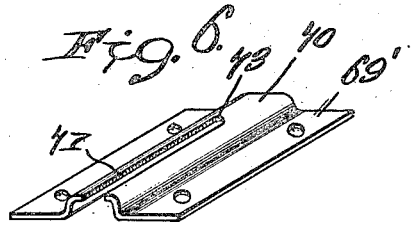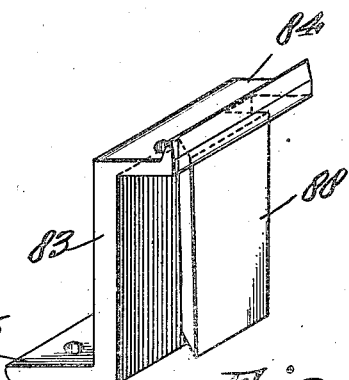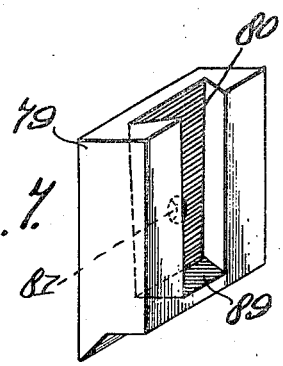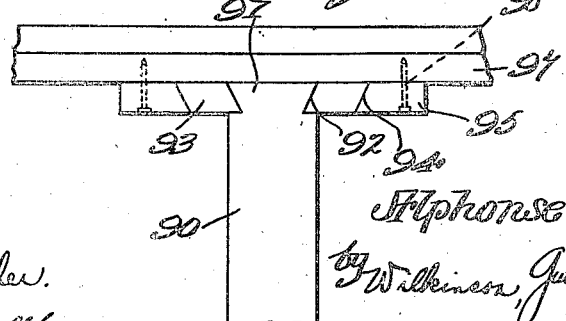

ALPHONSE GRAVEL, OF NEW ORLEANS, LOUISIANA.

PORTABLE HOUSE.

1,228,317. Specification of Letters Patent. Patented May 29, 1917.

Application filed July 7, 1916. Serial No. 108,008.

*To all whom it may concern:*

Be it known that I, ALPHONSE GRAVEL, a citizen of the United States, residing at New Orleans, in the parish of Orleans and State of Louisiana, have invented certain new and useful Improvements in Portable Houses; and I do hereby declare the following to be a full, clear, and exact description of the invention, such as will enable others skilled in the art to which it appertains to make and use the same.

The present invention relates to improvements in portable houses, and has for its primary object to provide an improved portable house the various parts of which will be constructed for ready assembly to provide the completed structure, and which will be arranged and disposed relatively so as to permit of quick removal, substitution, and disassembling when desired.

With these and other objects in view the invention consists in the novel details of construction and combinations of parts more fully hereinafter disclosed and particularly pointed out in the claims.

In the accompanying drawings forming a part of this application, and in which similar reference symbols indicate corresponding parts in the several views:

Figure 1 is a vertical sectional view through a portion of a portable house as constructed in accordance with the present invention, such section being taken on the line 1—1 in Fig. 2.

Fig. 2 is a horizontal sectional view taken on the line 2—2 in Fig. 1.

Fig. 3 is a sectional view through one of the sills and floor beams.

Fig. 4 is a perspective view of one of the plate castings.

Fig. 5 is a similar view of a connecting member.

Fig. 6 is a perspective view of a plate for receiving the rafters.

Figs. 7 and 8 are perspective views of the sill and floor beam connecting members.

Fig. 9 is a fragmentary top plan view showing a mode of fastening the floor sections to the floor beams.

Referring more particularly to the drawings, 1, in Fig. 2, designates a corner post which is formed with vertically extending channels 2 and 3 for receiving strips 4 and 5 having dove-tail tongues 6 and 7 projecting therefrom. These strips 4 and 5 are secured in the channels 2 and 3 in any suitable manner, as for example by nails 8 and 9, as shown. The dove-tail tongues 6 and 7 are arranged to be received into correspondingly formed grooves 10 and 11 provided between the members 12, 13, and 14, 15, of split posts, which are united by bolts or other means 16 and 17. Recesses 18 and 19 are made in the inner members 13 and 15 of said split posts, which are occupied by the threaded ends of the bolts 16 and 17 on which are run nuts 20 and 21, whereby the members of the split posts may be securely clamped together and about the tongues 6 and 7 to provide a tight joint excluding wind and dust.

At their opposite edges the split posts are formed with dove-tail grooves 22 and 23, similar to the grooves 10 and 11, for receiving the dove-tail tongues 24, 25, on strips 26 and 27, which form the edge of each section or panel. The inside wall boards 28 and the outside covering 29 are fitted against the strips 26 and 27, and against any number of other strips 30 found necessary, and secured to such strips by nailing, as at 31, or otherwise. By this arrangement there is an air space 32 provided between the inside wall boards 28 and the exterior covering 29.

The wall boards 28 and the covering 29, shown as broken away at the lower left hand corner of Fig. 2, extend to the next adjacent section or panel, where they are connected to split posts similar to those shown at 14, 15. The wall boards 28 and exterior covering 29, shown at the top of Fig. 2, run to and are secured over strips 33 having dove-tail tongues 34, which are received in dove-tail grooves 35 provided between the members 36 and 37 of a split post, in general similar to the split posts previously described.

The members 36 and 37 are secured together through bolts 38, similar to the bolts 16, 17, and at its opposite edge the post is formed with another dove-tail groove 39 in which is received a tongue 40 on a strip 41. The strip 41 furnishes means for securing wall boards 42 and an exterior covering 43, such boards and covering extending to the next adjacent section or panel, which is constructed similar to the part shown and described, and which will be readily understood; and so on, to the other end of the house (not shown).

To the member 37 of the split post is secured a dove-tail casting 44, by nailing or otherwise, as shown at 45. This casting 44 is adapted to occupy a recess 46 in a similar split post constituted of members 47 and 48 secured together by bolts 49. At their opposite edges the members 47 and 48 of this split post are formed with a groove 50 to receive a dove-tail tongue 51 on a strip 52. To the strip 52 are secured wall boards 53 and 54, providing a partition for dividing the interior of the house. To the boards 53 and 54 of the partition may be connected either centrally or at other point in the house, one or more split posts similar to those already described, but having grooves extending along all four edges of the same to receive locking strips projecting from the adjacent sections or panels of the partitions or walls.

The various parts above described are assembled, as shown in Fig. 1, on sills 55 and 56, of any suitable character, they being secured thereto by the coupling devices illustrated more particularly in Figs. 4 and 5. These elements include plate castings 57, perforated as at 58 to receive screws or other means 59, whereby they are fastened to the members of the various split posts. Such plate castings 57 are clearly shown in Fig. 1 as secured to the members 14 and 15 of one end split post and to the members 47 and 48 of a central split post. When the members of the split posts are fitted together the plate castings 57 unite in pairs to fit on opposite sides of, and having inclined walls 59 and a constricted opening 60 for receiving, a correspondingly shaped casting 61, illustrated in perspective in Fig. 5, and having a perforation 62 through which may be passed a nail or other securing means 63 for fastening such element to its sill. The element 61 is formed with inclined walls 63, being the counterpart of the walls 69 in the plate castings 57, and a straight-faced lower edge 64 for snugly fitting the edges 60 in the plate castings 57.

Above the walls and partitions of the house and supported on the corner and split posts are beams 65, 66, advantageously shown in Fig. 1; such beams being preferably connected to the posts by plate castings 57 and coupling elements or heads 61, although other means may be substituted therefor, if desired or found necessary. Between the beams 65 and 66 are supported cap beams 68, to which the ceiling may be attached. Upstanding from the beam 66 are the king posts 100 fastened thereto as by dowels 101, and supporting the ridge pole 102 to which they are united through dowels or other means 103. To the end beams 65 are secured blocks 67 having inclined edges, to which, and to the ridge pole 102, are secured plates 69', shown more particularly in Fig. 6 to be formed with centrally offset portions 70 slotted as indicated at 71. The slots 71 in the plates 69' are for receiving the projecting shanks of screws 72, the heads whereof will occupy the space beneath the offset central portion 70, and when in proper position the adjacent screws 72 will abut against the shoulders 73 of the slots 71. The screws 72 are threaded in rafters 74 and afford a convenient means with the plates 69' of detachably securing such rafters in the position advantageously disclosed in Fig. 1.

The floor of the improved portable house is preferably built up of two or more layers of tongue-and-groove material, as indicated at 75 and 76 in Fig. 1, with a layer of paper or other suitable material 77 interposed therebetween. The lowermost layer 76 of the floor is secured to the batten and to the floor beams 78. These floor beams 78 are advantageously supported from the sills 55 and 56 by connecting means shown in perspective in Figs. 7 and 8.

Fig. 7 illustrates at 79 a casting formed with a beveled dove-tailed slot 80 and a perforation 81 for receiving a screw or other means 82, whereby such casting 79 is connected to its sill 55 and 56. To the floor beam is attached a complementary casting 83, illustrated in Fig. 8 to be formed with upper and lower oppositely disposed offset flanges 84 and 85, perforated for the passage of screws or other means 86 and 87 through which castings are connected to the floor beams 78. The casting 83 is provided with a beveled dove-tail tongue 88 for snugly fitting the beveled slot 80 in the casting 79 and for resting with its lower end on the shoulder 89 at the bottom of said slot. The flange 84 of the casting 83 rests upon the upper end of the casting 79, and through these connecting members the floor beams 78 are supported from the sills 55 and 56 in a manner which is clearly illustrated in Fig. 1.

In Fig. 9 is illustrated a mode of fastening the floor sections to the floor beams, which are designated at 90 and illustrated to be formed with dove-tail tongues 91. The tongues 91 on the floor beams 90 are adapted to fit similarly shaped openings 92 in wedge members 93; and such wedge members 93 are fitted within recesses 94 in cleats 95. Nails or other securing means 96 are provided to secure the cleats 95 to the floor sections 97. This method may also be employed to fasten the ceiling and roof sections to the rafters.

From the construction above described and illustrated in the accompanying drawings, it will be readily apparent that the improved portable house may be quickly erected by selecting from the transported materials the proper sills 55, 56, etc., and connecting these sills in the proper formation by the floor beams 78. Such floor beams 78 will be readily understood to connect with the sills 55 and 56 by allowing the former, carrying the castings 83 to descend between the latter, to which are secured castings 79; and in so doing bringing the tongues 88 into alinement with the slots 80 in the casting 79 and guiding the same therein until they rest upon the shoulders 89, when the beams will be in place securely connecting the sills. The flooring 75, 76, etc., may be now fastened to the batten or beams 78, or the same may be laid only after the remainder of the house is assembled, as may be desirable or necessary.

The coupling elements or heads 61 having been secured to the sills 55 and 56, referring to Fig. 1, the members 14, 15, and 47, 48, of the split posts with the plate castings 57 therein, are brought together about such heads or elements 61 in the manner shown, and the bolts 17 and 49 thereupon tightened to clamp the members of the posts securely thereabout.

It will be understood, of course, that the beams 65 and 66 supported from the split posts and the various strips 6, 7, 26, 27, etc., will be in proper place before the members of the split posts are assembled and tightened, and before or after this operation has been effected the rafters 74 may be put in place.

The improved house may be disassembled in a similar or other manner, and transported wherever desirable to be subsequently re-erected.

It is obvious that those skilled in the art may vary the details of construction and arrangements of parts without departing from the spirit of my invention, and therefore I do not wish to be limited to such features except as may be required by the claims.

I claim:

1. A building construction including a foundation, split posts erected on said foundation and having complemental recesses in the bases of the sections thereof, coupling heads on said foundation adapted to fit said recesses for securing the split posts in place thereon, and means for securing the sections of the split posts together with the recessed ends clamping said coupling heads, substantially as described.

2. A building construction including sills, beams connecting said sills, a floor laid on said beams, split posts erected on said sills, coupling heads carried by said sills, plates carried by the sections of said split posts and adapted to embrace said coupling heads to secure the posts to said sills, means for clamping the sections of the posts together about said coupling heads, and walls extending between said posts.

3. A building construction including a foundation, divided posts erected on said foundation and having recesses at the opposite ends thereof, coupling heads on said foundation adapted to be received into the recesses in the lower ends of said split posts whereby to secure the same in position thereon, beams supported by said divided posts, coupling heads on said beams arranged to be embraced by the recesses in the upper ends of said posts to hold the parts together, and means for securing the sections of said divided posts together, substantially as described.

4. A building construction including a foundation, divided posts erected on said foundation and having recesses in the ends thereof, plates carried by said posts and fitted in said recesses, means for securing the sections of the posts together, coupling heads on said foundation received between the plates on the lower ends of said posts for securing the same to the foundation, beams supported by said posts, and coupling heads on said beams received between the plates in the upper ends of said posts, substantially as described.

In testimony whereof, I affix my signature.

ALPHONSE GRAVEL.